United States Patent
Shimizu et al.

(10) Patent No.: US 6,921,504 B2
(45) Date of Patent: Jul. 26, 2005

(54) PROCESS OF MAKING FLAME RETARDING POLYPROPYLENE FIBER

(75) Inventors: Yoshishige Shimizu, Toyohashi (JP); Hiroshi Yamamoto, Toyohashi (JP); Hideo Sakakura, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 351 days.

(21) Appl. No.: 10/274,126

(22) Filed: Oct. 21, 2002

(65) Prior Publication Data

US 2003/0138626 A1 Jul. 24, 2003

Related U.S. Application Data

(62) Division of application No. 09/827,346, filed on Apr. 6, 2001.

(30) Foreign Application Priority Data

Apr. 6, 2000 (JP) .................................. 2000-104600
Mar. 23, 2001 (JP) .................................. 2001-084944

(51) Int. Cl.[7] .................. D01D 5/12; D01D 5/34; D01D 10/02; D01F 1/07; D01F 6/06
(52) U.S. Cl. ............... 264/103; 264/172.15; 264/210.5; 264/210.6; 264/210.8
(58) Field of Search ................ 264/103, 172.15, 264/210.5, 210.6, 210.8

(56) References Cited

U.S. PATENT DOCUMENTS 5,393,812 A * 2/1995 Haley et al. ................. 524/91

6,472,456 B1 * 10/2002 Horsey et al. ................. 524/99

FOREIGN PATENT DOCUMENTS

| JP | 7-102128 A | 4/1995 |
| JP | 9-310048 A | 12/1997 |
| JP | 11-60837 A | 3/1999 |
| WO | WO 99/00450 A1 | 1/1999 |

OTHER PUBLICATIONS

Abstract, "Cross–linkable and Highly Flame–Retardant Composition Excellent in Heat Resistance." Inventor: Hideo et al., JP 7–102128, Publication Date: Apr. 18, 1995.

Abstract, "Polyolefin–based Flame Resistant Adhesive Type," Inventor: Ryuichi, JP 9–310048, Publication Date: Dec. 2, 1997.

Abstract, "Flame–Retardant Polypropylene Compound, Its Production and Stampable Sheet and Molded Stampable Sheet." Inventor: Masahiki et al., JP11–060837, Publication Date: Mar. 5, 1999.

* cited by examiner

*Primary Examiner*—Leo B. Tentoni
(74) *Attorney, Agent, or Firm*—Kendrew H. Colton; Fitch Even Tabin & Flannery

(57) ABSTRACT

A method for producing a flame retarding polypropylene fiber having both good flame retardancy and good fiber strength, and which generates no toxic gas, includes mixing 0.4% by wt. or more of a hindered amine-based stabilizer and 0.5% by wt. or more of a phosphoric ester-based flame retardant with a polypropylene resin having an MPR of 5 to 50 g/10 min, melt-spinning the mixture to form an undrawn yarn, drafting the yarn at a drafting magnification of 2 to 7 fold and a drafting temperature of 50 to 100° C., and further thermally setting at 60 to 140° C.

6 Claims, 1 Drawing Sheet

PROCESS OF MAKING FLAME RETARDING POLYPROPYLENE FIBER

CROSS-REFERENCED APPLICATIONS

This application is a divisional application of U.S. application Ser. No. 09/827,346 filed Apr. 6, 2001.

BACKGROUND OF THE INVENTION

1. Field of the Invention

The present invention relates to a polypropylene fiber having both adequate strength and high flame retardancy and generating no toxic gas at the time of burning, a production method thereof and a flame retarding polypropylene film.

2. Description of the Related Art

As polypropylene fiber products having flame retardancy, those obtained by bestowing a halogen-based retardant to fiber products composed of, for example, a polypropylene fiber by post processing have been conventionally general. Or, for example, a flame retarding fiber obtained by kneading a flame retardant in a fiber which is obtained by preliminarily adding a flame retardant to a polypropylene resin to be melt spun has been also known.

It has been recently required to use a non-halogen-based retardant which does not also generate a toxic gas even at combustion from an environmental viewpoint. As a product in which a non halogen-based flame retardant is used, for example, a polyolefin-based flame retarding adhesive tape disclosed in Japanese Patent Laid-Open Publication No. 9-310048 is disclosed. The tape is provided with an adhesive on the tape substrate, mainly composed of a polyolefin-based resin and a flame retardant. The tape substrate is compounded with an inorganic flame retardant as a flame retardant, a hindered amine-based compound as a weather resistant agent, and a hydrotalcite compound as a weather resistant aid for the polyolefin-based resin, kneaded, dispersed and made in a sheet. The inorganic flame retardant includes magnesium hydroxide, aluminum hydroxide, stannic oxide, antimony oxide, red phosphorous and the like.

Further, a cross-linking flame retarding composition having good heat resistance which is used for molded articles such as a film, a sheet, a pipe, a container, an electric wire, a cable and the like is disclosed in Japanese Patent Laid-Open Publication No. 7-102128. The composition is composed of a predetermined resin material including a polyolefin-based resin, a flame retardant and red phosphorous at a predetermined proportion. As the flame retardant, addition-type flame retardants such as a halogen-based retardant, a phosphorous-based flame retardant, an inorganic flame retardant and the like may be used. Further, it is suggested that higher flame retardancy can be further bestowed by compounding red phosphorous.

For example, a flame retarded polypropylene compound suitable for producing a stampable sheet excellent in flame retardancy is disclosed in Japanese Patent Laid-Open Publication No. 11-60837. A specific amount of a metal hydrate as a flame retardant for a polypropylene is contained in the flame retarding polypropylene compound. Thus, it is suggested that mesh choking caused by the melt adhesion of a pulverized article (compound) according to pulverization at room temperature can be also suppressed by compounding the specific amount of the metal hydrate.

However, the product obtaining flame retardancy using these flame retardants has a high concentration of compounding a flame retardant. Specifically, given that the resin component is 100 by weight, the flame retardant is 30 to 200 by weight in the polyolefin-based flame retarding adhesive tape disclosed in Japanese Patent Laid-Open Publication No. 9-310048, 5 to 200 by weight in the cross-linking flame retarding composition of Japanese Patent Laid-Open Publication No. 7-102128, and 50 to 200 by weight in the flame retarded polypropylene compound of Japanese Patent laid-Open Publication No. 11-60837.

Any one of the resin materials disclosed in these Publications is a sheet and various kinds of molded articles, and a use as a fiber is not intended. Accordingly, there is no problem in strength even if an extremely high concentration of a flame retardant as described above is added, but when such resin materials are used for fiber uses or thin film, only a fiber or film physically having low strength is obtained. And there may be problems in stability at the time of spinning and film forming.

Further, a light resistant stabilizer is usually added in the polypropylene fiber in order to maintain fiber physical properties, but the light resistant stabilizer is deactivated by a flame retardant, and there is a great problem that the lowering of strength in a lapse of time is remarkable.

On the other hand, it is disclosed in International Patent Publication (Unexamined) No. WO99/00450 (PCT/US98/13469) that in particular, an NOR type compound among hindered amine-based compounds known as a light resistant stabilizer reveals flame retardancy. Further, it is disclosed in the same Publication that the NOR type hindered amine-based compound can be added in various resin materials and 0.25 to 1.0% by weight of the NOR type hindered amine-based compound is added as the flame retardant of a polypropylene fiber in its Example. The polypropylene fiber containing 1.0% by weight of only the NOR type hindered amine-based compound shows the same level of flame retardancy as a polypropylene fiber containing 3% of a bromic acid-based flame retardant which is widely known as the flame retardant used for a conventional fiber.

Further, the content of the various NOR type hindered amine-based compounds is changed to be added for various fibers containing a propylene fiber in the same Publication, and flame retardancy thereof is studied. However, properties other than initial flame retardancy, for example, the durabilities of the fiber strength and the flame retardancy are not studied in the International Patent Publication (Unexamined), therefore there is no description thereof at all. Further, it is disclosed in the International Patent Publication (Unexamined) that other flame retardants such as a phosphorous-based compound, a halogen-based compound, and the like are used with the NOR type hindered amine-based compounds in combination and the whole amount is 0.5 to 20% by weight. However, a specific study in case of containing a flame retardant in the polypropylene fiber in combination is not carried out.

Further, since the NOR type hindered amine-based compound which functions as the flame retardant has also a function as a light stabilizer, the same NOR type hindered amine-based compound lowers both functions in a lapse of time, and cannot keep a fixed flame retardancy over a long period.

SUMMARY OF THE INVENTION

Accordingly, the present invention was developed in order to solve the above-mentioned problems in conventional technologies, and has a purpose to provide a non-halogen based polypropylene flame retarding fiber capable of keeping good flame retardancy over a long period, having adequate fiber strength required to be used for building materials such as a curing net and the like, and generating no toxic gas even if it is burnt, a production method thereof, and a non-halogen based polypropylene flame retarding film also generating no toxic gas even if it is burnt.

The present inventors have intensively carried out studies in order to solve the above-mentioned problems, and found that a polypropylene flame retarding fiber capable of keeping high flame retardancy over a long period and also having adequate fiber strength for practical uses can be obtained when a polypropylene fiber contains a specific range of a phosphoric ester-based flame retardant and an NOR type hindered amine-based stabilizer in a polypropylene fiber. And it is also found that a polypropylene film having high flame retardancy can be obtained when a polypropylene film contains a specific range of a phosphoric ester-based flame retardant and an NOR type hindered amine-based stabilizer, even in the case that the film is thin also.

Namely, a main aspect of the present invention is a flame retarding polypropylene fiber containing 0.5% by weight or more of a phosphoric ester-based flame retardant and 0.4% by weight or more of an NOR type hindered amine-based stabilizer.

The polypropylene fiber of the present invention includes a fiber mainly composed of a polypropylene resin capable of melting such as a copolymer of propylene with other α-olefin monomer such as ethylene, 1-butene or the like, other than a fiber mainly composed of a propylene homopolymer.

It is important that the flame retarding polypropylene fiber of the present invention contains 0.5% by weight or more of a phosphoric ester-based flame retardant and 0.4% by weight or more of an NOR type hindered amine-based stabilizer (hereinafter, described as "HALS-based stabilizer" in abbreviation) as a weight proportion in the fiber. When the contents of the phosphoric ester-based flame retardant and the NOR type hindered amine-based stabilizer are within the above-mentioned range, the flame retardancy of the phosphoric ester-based flame retardant can be accelerated by the NOR type hindered amine-based stabilizer.

A polymer main chain is cut in a solid phase during combustion process of a polypropylene, alkyl radicals (R.) occur and react with oxygen, namely, burn, then it is considered that the NOR type HALS catches the alkyl radicals generated from the polymer and suppresses the reaction with oxygen, therefore flame retardancy is obtained. Further, since the reaction speed of conventional HALS-based stabilizers such as NH type and $NCH_3$ type with the alkyl radicals is low in comparison with the NOR type HALS-based stabilizer, flame retardancy such as a case of containing the NOR type HALS-based stabilizer is not revealed.

Thus, since excellent flame retardancy can be secured by the synergy effect of the NOR type HALS-based stabilizer and the phosphoric ester-based flame retardant even if the content of the phosphoric ester-based flame retardant is little, the content of the phosphoric ester-based flame retardant can be made small, so that necessary and sufficient fiber strength can be secured. Further, even if flame retarding effect by the NOR type HALS-based stabilizer is reduced in a lapse of time, flame retardancy is supplemented by the phosphoric ester-based flame retardant, and required flame retardancy can be maintained.

Namely, according to the present invention, the content of a phosphoric ester-based flame retardant can be sharply reduced to 0.5% by weight or more, and further, although the content of the phosphoric ester-based flame retardant is extremely small, high flame retardancy can be bestowed to the flame retarding polypropylene fiber of the present invention by the synergy effect with the NOR type HALS-based stabilizer, and adequate strength as a fiber can be provided. Accordingly, the flame retarding polypropylene fiber of the present invention can be used for not only indoor uses such as an automobile interior material, a carpet and the like which are quite common, but also for outdoors of the sites of public works, construction, and the like as a curing sheet, and can be utilized in wide uses.

The content of the phosphoric ester-based flame retardant is required to be 0.5% by weight or more, and further, 0.5 to 3.0% by weight is preferable. When the content of the phosphoric ester-based flame retardant is less than 0.5% by weight, the synergy effect with the NOR type HALS-based stabilizer is not obtained and flame retardancy becomes inadequate. And when the content exceeds 3.0% by weight, the lowering of fiber strength occurs, so that preferably it is 3.0% by weight or less.

The content of the NOR type HALS-based stabilizer contained in the polypropylene fiber is required to be 0.4% by weight or more. Further, it is preferable that 0.5 to 2.0% by weight of the NOR type HALS-based stabilizer is contained. When the content of the NOR type HALS-based stabilizer is less than 0.4% by weight, adequate fiber strength cannot be obtained because the content of the phosphoric ester-based flame retardant must be increased in order to obtain adequate flame retardancy. On the other hand, if the content of the NOR type HALS-based stabilizer exceeds 2.0% by weight, an effect of improving the flame retardancy of the phosphoric ester-based flame retardant is not expected, and moreover a problem that spinning stability is lost may occur and production cost would be high. Therefore, the content of the NOR type HALS-based stabilizer is preferably 2.0% by weight or less.

Preferably, the fiber strength of the flame retarding polypropylene fiber is 4.0 cN/dtex or more.

When the fiber strength is less than 4.0 cN/dtex, the fiber strength becomes insufficient, and physical properties required for fiber products developed in the uses of building materials such as a curing net cannot be satisfied.

Further preferably, the mean value of the number of times of contact flame which was obtained by measuring 5 samples in accordance with the method of JIS No. L-1091 D is 4 or more and the number of times of contact flame of 5 samples do not show a result of 3 times or less.

Further, the contact flame test of JIS No. L-1091 D is as below. Namely, a test piece having a width of 100 mm and a mass of 1 g is rolled to have a width of 100 mm, inserted in a test piece-supporting coil having an inner diameter of 10 mm, a line mutual interval of 2 mm and a length of 150 mm which is made of a hard stainless copper wire having a diameter of 0.5 mm, and retained at a slant angle of 45° in a burning test box. The flame of a micro burner is brought in contact with the lowest end of the test piece, and the test piece is heated by fixing the position of the micro burner until combustion is stopped while being melted. Further, the burner is moved so that the flame of the micro burner is brought in contact with the lowest end of the residual test piece, and it is heated in similar manner as the previous time. The same operation is repeated until the position being 90 mm from the lower end of the test piece is melted and burnt, and the number of times of contact flame are counted.

In accordance with the method of JIS No. L-1091 D, the flame retardancy is recognized if the mean value of the number of times of contact flame obtained by testing 5 samples is more than 3, but the present invention intends to obtain higher flame retardancy. Therefore, in the present invention, when the mean value of the number of times of contact flame which was obtained by testing 5 samples in the above-mentioned contact flame test is less than 4, the flame retardancy is insufficient, and when a result of 3 or less is included in the results of the number of times of contact flame of 5 samples, the stability of the flame retardancy is judged to be insufficient.

Further preferably, a time required for firing is 10 seconds or more when the sample is fired by a micro burner in accordance with the contact flame test by the JIS No. L-1091 D method.

Namely, it is described in the JIS No. L-1091 D method that firing is continued until a sample starts burning, but firing time is not prescribed. Accordingly, there occurs a contradiction that the time until firing is long in a sample having an excellent flame retardancy, a considerable amount of the sample is lost by melting before firing, and the number of times of contact flame becomes small. Then, in the present invention, when contact flame time required for starting the burning is 10 seconds or more, it was confirmed that there is a high flame retardancy.

As the phosphoric ester-based flame retardant, an aromatic polyphosphate, an aliphatic polyphosphate and the like are specifically mentioned. The phosphoric ester-based flame retardant is not specifically limited as long as it is not decomposed and degenerated at 250° C. and is the one capable of being kneaded, but according to the invention, the phosphoric ester-based flame retardant is an aromatic polyphosphate.

Particularly, the aromatic polyphosphate indicated by the structures represented by the following chemical formulas 1 and 2 are preferably adopted, and this aromatic polyphosphate has an excellent aptitude that it reveals an adequate flame retardancy even if a small amount thereof is added.

Still preferably, R of the alkoxyl group, (—OR), of the NOR type hindered amine-based stabilizer is a cycloalkyl group having 5 to 12 carbons.

Further, since the NOR type HALS-based stabilizer functions as a light resistant stabilizer, it is deactivated in a lapse of time, and the content of the HALS-based stabilizer in a fiber decreases in a lapse of time. As a result, the synergy effect of the HALS-based stabilizer with the phosphoric ester-based flame retardant is lowered, and it cannot be denied that the flame retardancy is lowered in a lapse of time.

Accordingly, it is desirable to make the polypropylene fiber contain an ultra-violet ray absorber in order to prevent the lowering of the flame retardancy in a lapse of time. Thus, the flame retarding polypropylene fiber excellent in durability can be obtained by using the ultra-violet ray absorber in combination as a light resistant stabilizer.

Further preferably, less than 0.3% by weight of an ultra-violet ray absorber as a light resistant stabilizer is contained. Moreover, the content of the ultra-violet ray absorber is preferably in a range of 0.1 to less than 0.3% by weight. Further, the ultra-violet ray absorber can be arbitrarily selected from ultra-violet ray absorbers such as benzotriazole-based, benzophenone-based, benzoate-based, and cyanoacrylate-based, and the like. In particular, a benzophenone-based ultra-violet ray absorber is suitably used.

Also preferably, the polypropylene fiber is a multi-filament yarn. When the flame retardant polypropylene fiber is a multifilament yarn, it is preferable in particular because, when a cloth is made, the strength and delicacy of the cloth are excellent.

However, the flame retarding polypropylene fiber of the present invention may be either of a staple or a lint, and the lint may be any yarn type of a monofilament yarn and a multifilament yarn. And it may be a fiber, such as a spun bond yarn, composing a non-woven fabric when the non-woven fabric is made directly from spun yarn. Further, the size of the flame retarding polypropylene fiber of the present invention is not specifically limited, and an arbitrary size of fiber can be used. The fiber sectional form of the flame retarding polypropylene fiber may be different sections such as a circular section, a hollow section, a triangle and the like.

Further, other additives such as a coloring pigment, a dispersing agent, a fluorescent bleaching agent, a delustering agent, a lubricant, an anti-static agent, an antibacterial agent and the like may be compounded within a range which does not damage fiber physical properties.

Preferably, the flame retarding polypropylene fiber has a core-sheath structure, a core component is a polypropylene resin containing the phosphoric ester-based flame retardant and the NOR type hindered amine-based stabilizer, a sheath component is a polypropylene resin containing 0.3% by

[Chemical formula 1]

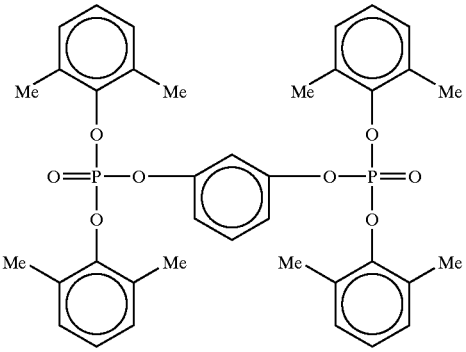

[Chemical formula 2]

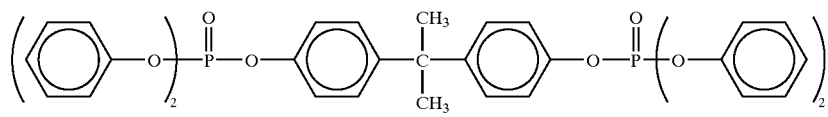

weight or less of the hindered amine-based stabilizer, and the total fiber contains 0.5% by weight or more of the phosphoric ester-based flame retardant and 0.4% by weight or more of the NOR type hindered amine-based stabilizer.

Since the HALS-based stabilizer may have an odor being specific for an amine-based compound and is a small amount is added when it is used as a usual light stabilizer, the odor does not cause a problem in the final product. However, since the HALS-based stabilizer is added in the present invention in order to improve the flame retardancy, the amount added is large in comparison with a case of adding it as a usual light stabilizer. Accordingly, there may be a case of having a trouble caused by the odor of the HALS-based stabilizer in the final product. Then, according to the invention, the odor can be suppressed to a certain degree having no problem, by adding the phosphoric ester-based flame retardant and the NOR type HALS-based stabilizer for imparting the flame retardancy to the component of the core portion as a core-sheath type conjugated fiber.

Further, even the core-sheath type conjugated fiber can obtain the same flame retardancy as a fiber having a single structure, when the amounts of the phosphate-based flame retardant and the NOR type hindered amine-based stabilizer contained in the total fiber are within the range prescribed in the invention. Accordingly, the ratio of the core portion and the sheath portion is not specifically limited, but the ratio of the core portion/the sheath portion is preferably a range of 1/3 to 3/1 considering the stability of a sectional form, the reeling stability and the like.

Further, the flame retarding polypropylene fiber of the present invention may be not only the core-sheath type conjugated fiber, but also a junction type (side-by side type) conjugated fiber, and further, a fiber structure having various conjugated modes such as an sea-island fiber and the like can be adopted. Further, the flame retarding polypropylene fiber of the present invention is used as a woven or knitted fabric and a non woven fabric.

In order to produce the above-mentioned flame retarding polypropylene fiber of the present invention, another aspect of the present invention provides a production method of a flame retarding polypropylene fiber, wherein 0.4% by weight or more of a hindered amine-based stabilizer and 0.5% by weight or more of a phosphoric ester-based flame retardant are mixed with a polypropylene resin having a melt flow rate value of 5 to 50 g/10 min., the mixture is melt-spun to form an undrawn yarn, and then the yarn is drafted at a drafting magnification of 2 to 7-fold and a drafting temperature of 50 to 100° C. and further set thermally at a temperature of 60 to 140° C.

As a process of mixing the hindered amine-based stabilizer, the phosphoric ester-based flame retardant, and further, the ultra-violet ray absorber, if necessary, with the polypropylene resin, there is a process of adding the hindered amine-based stabilizer, the phosphoric ester-based flame retardant, and the ultra-violet ray absorber with the polypropylene resin just before melt spinning so as to be melt spun. Or, considering the dispersing property of a flame retardant, there is a preferable process in which a master batch (hereinafter, described as "MB") obtained by preliminarily adding each of the hindered amine-based stabilizer, the phosphoric ester-based flame retardant, and the ultra-violet ray absorber with the polypropylene resin in a high concentration are prepared respectively, a pellet of the polypropylene resin is blended with respective MB's of the hindered amine-based stabilizer and the phosphoric ester-based flame retardant just before melt spinning so as to be the above-mentioned desired contents, and melt spinning is carried out.

Further, the addition amounts of the hindered amine-based stabilizer and the phosphoric ester-based flame retardant in the master batch are preferably 1.5 to 60% by weight. When the addition amounts of the stabilizer and the flame retardant in the master batch exceeds 60% by weight, the preparation of the master batch is difficult, and the particle diameters of the master batch vary, therefore it becomes a cause of a trouble at spinning stage.

The melt flow rate value of the polypropylene resin is preferably set at a range of 5 to 50 g/10 min. considering fiber strength, and more preferably 10 to 30 g/10 min. Further, the melt flow rate value in the present invention is measured at measurement conditions of a test temperature of 230° C. and a test load of 2.16 Kg in accordance with JIS No. K7210.

When the melt flow rate value is less than 5 g/10 min., it is required to highly set a spinning temperature at melt spinning in order to secure an adequate reeling property, and there occurs a trouble at the time of melt spun that a pigment for coloring, a flame retardant and the like which are added to the polyolefin resin are degenerated, colored and discolored. On the other hand, when the melt flow rate value is higher than 50 g/10 min., only a fiber having low strength is obtained.

The spinning temperature is preferably 210 to 250° C. When the spinning temperature is less than 210° C., a fiber having only low strength is obtained even if a polypropylene resin having a melt flow rate value of 50 g/10 min. is used. Further, when the temperature is higher than 250° C., a pigment for coloring, a flame retardant and the like which are added to the polyolefin resin are degenerated, colored and discolored.

The undrawn yarn obtained by melt spinning is then drafted at ranges of a drafting magnification of 2 to 7-fold, preferably 4 to 7-fold, and a drafting temperature of 50 to 100° C., and further set thermally at a temperature of 60 to 140° C.

When the drafting magnification is less than 2-fold, the strength of a fiber obtained is low, and elongation becomes high. When the drafting magnification exceeds 7-fold, the spinning stability is deteriorated. Further, when the drafting temperature is less than 50° C., high magnification drafting cannot be carried out, fiber strength is low and reeling stability is also deteriorated. On the other hand, when the drafting temperature exceeds 100° C., the reeling stability is lowered.

Concerning the thermal setting, either of a heating plate system or a heating roller system can be adopted. When the thermal setting temperature is less than 60° C., shrinkage remains in a fiber obtained, and the dimensional stability of a product after processing as the product such as an industrial material or the like is deteriorated. On the other hand, when the thermal setting temperature exceeds 140° C., the spinning stability is lowered.

Further, in the process of the present invention, fiber fabrication is also possible by a so-called direct spinning drafting process such as SDW of continuously stretching a fiber melt spun, or the like without winding up an undrawn yarn melt spun.

According to still another aspect of the invention, there is provided a flame retarding polypropylene film containing 0.5% by weight or more of a phosphoric ester-based flame retardant and 0.4% by weight or more of an NOR type hindered amine-based stabilizer.

The flame retarding polypropylene film of the present invention contains 0.5% by weight or more of a phosphoric ester-based flame retardant and 0.4% by weight or more of an NOR type hindered amine-based stabilizer. Therefore, likewise the above-described flame retarding polypropylene fiber, the flame retardancy of the phosphoric ester-based flame retardant can be accelerated by the NOR type hindered amine-based stabilizer. Accordingly, excellent flame retardancy can be secured even if the content of the phosphoric ester-based flame retardant is little. Therefore, the content of the phosphoric ester-based flame retardant can be made small, so that necessary and sufficient fiber strength can be secured. Further, even if flame retarding effect by the NOR type HALS-based stabilizer is reduced in a lapse of time, flame retardancy is supplemented by the phosphoric ester-based flame retardant, and required flame retardancy can be maintained.

The content of the phosphoric ester-based flame retardant is required to be 0.5% by weight or more, and further, 0.5 to 3.0% by weight is preferable. The content of the NOR type HALS-based stabilizer contained in the polypropylene fiber is required to be 0.4% by weight or more. Further, it is preferable that 0.5 to 2.0% by weight of the NOR type HALS-based stabilizer is contained.

Preferably, R of an alkoxyl group, (—OR), of the NOR type hindered amine-based stabilizer is a cycloalkyl group having 5 to 12 carbons, and the phosphoric ester-based flame retardant is an aromatic phosphate.

And according to the invention, a thickness of the film is 300 $\mu$m or less, and the film is not fired at a vertical burning test of the JIS No. L-1091 A4 method, or, even if it is fired, the fire is naturally extinguished within 5 seconds without the spread of fire.

Further, the vertical burning test of the JIS No. L-1091 A4 method is as follows. Namely, a test piece of about 70 mm×300 mm is prepared, and the flame length of a micro burner is adjusted so as to be 38 mm in a burning test box. The test piece is fixed so that the lower end of the test piece becomes a height of 19 mm from the orifice of the micro burner. The position of the burner is adjusted so that flame contacts the center of the width of the test piece, and the test piece is fired. After heating for 12 seconds, the flame is removed, a residual flame time is measured. The measurement is repeated five times, and the average value was referred to as a measurement result.

It is important for revealing the flame retardancy that the thickness of the film is 300 $\mu$m or less, and preferably 100 $\mu$m or less. When the thickness of the film is 100 $\mu$m or less, it is not fired in the vertical burning test of the JIS No. L-1091 A4 method, and when it is more than 100 $\mu$m and 300 $\mu$m or less, the film is fired, but fire is extinguished within 5 seconds. When the thickness of the film exceeds 300 $\mu$m, the spread of fire is continued, and the flame retardancy is not observed.

Further, the flame retarding polypropylene film of the present invention is not limited to a film composed of a single layer, and may be a multi-layer film. And the film may be a drawn or undrawn film. Further, the film of the present invention also includes a split yarn which is its modified mode.

Preferably, the flame retarding polypropylene film is comprised of multiple layers, at least one of intermediate layers is composed of a polypropylene resin containing the phosphoric ester-based flame retardant and the NOR type hindered amine-based stabilizer, an outermost layer is composed of a polypropylene resin containing 0.3% by weight or less of the hindered amine-based stabilizer, and the whole film contains 0.5% by weight or more of the phosphoric ester-based flame retardant and 0.4% by weight or more of NOR type hindered amine-based stabilizer.

In the film having multiple layers, by adding the phosphoric ester-based flame retardant and the NOR type hindered amine-based stabilizer to at least one of the intermediate layers, the odor due to the HALS-based stabilizer can be suppressed while maintaining the flame retardancy.

A layer containing the phosphoric ester-based flame retardant and the NOR type HALS-based stabilizer is not necessarily intermediately provided but the layer containing the phosphoric ester-based flame retardant and the NOR type HALS-based stabilizer may be provided as the outermost layer.

Also preferably, a thickness of each of the intermediate layer is 300 $\mu$m or less, and the film is not fired at a vertical burning test of the JIS No. L-1091 A4 method, or, even if it is fired, the fire is naturally extinguished within 5 seconds without the spread of fire. Namely, in the case that there provided a multiplicity of layers having flame retardancy and containing the phosphoric ester-based flame retardant and the NOR type HALS-based stabilizer in the flame retardant polypropylene film composed of the multiple layers, each layer has a thickness of 300 $\mu$m or less.

A usual resin film production process such as T-die method or inflation method can be appropriately adopted in order to produce the flame retarding polypropylene film of the present invention, and the production process is not limited, but for example, it is preferable to produce it by mixing 0.4% by weight or more of the hindered amine-based stabilizer and 0.5% by weight or more of the phosphate-based flame retardant with a polypropylene resin having a melt flow rate value of 5 to 50 g/10 min., extruding the mixture out of a T-die to form an unstretched film, and biaxially stretching it so that the thickness of the film is 300 $\mu$m or less.

DESCRIPTION OF THE PREFERRED EMBODIMENT

Embodiments of the present invention are described below presenting specific data.

Figure 1:
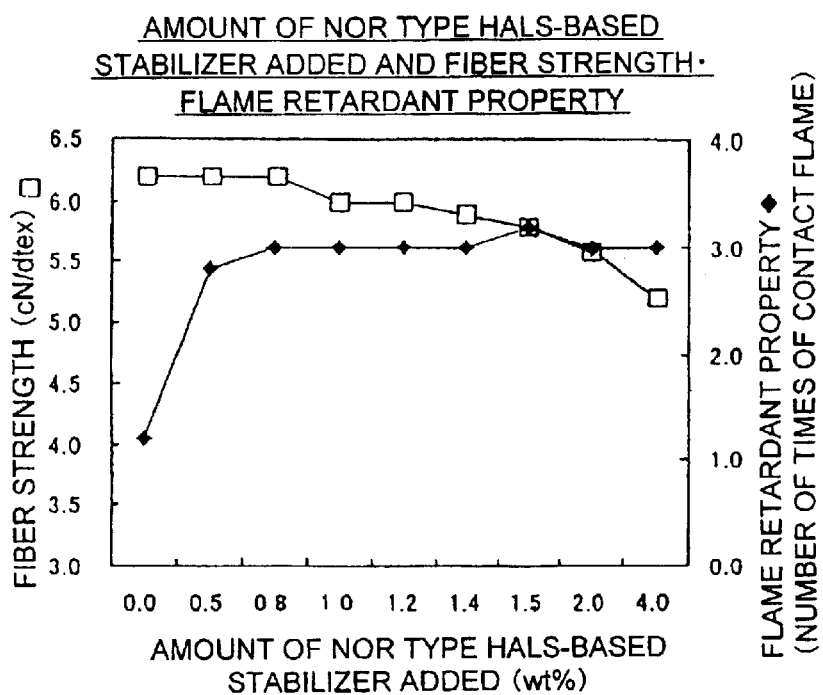
FIG. 1 is a graph showing a relation of flame retardancy and fiber strength with the content of a NOR type HALS-based stabilizer.

FIG. 1 is a graph showing a relation of flame retardancy and fiber strength with the content of a NOR type HALS-based stabilizer, for a polypropylene multi-filament yarn in which "CGL-116L" manufactured by Chiba Specialty Chemicals Co., Ltd. is contained alone as the NOR type HALS-based stabilizer.

A master batch (MB) in which the NOR type HALS-based stabilizer is added to the polypropylene resin in high concentration is prepared, the MB is blended with the pellet of the polypropylene resin just before melt spinning in such a manner that the content of the NOR type HALS-based stabilizer becomes 0 to 4% by weight, melt spun, and thermally stretched, and the flame retardancy and fiber strength were measured.

When the content of the NOR type HALS-based stabilizer is 1.5% by weight, the maximum flame retardancy is revealed, and even if 2% by weight or more of the NOR type HALS-based stabilizer is contained, the flame retardancy does not increase and is unchanged, and the fiber strength is apt to be lowered. It is grasped from the graph that the NOR type HALS-based stabilizer itself has the flame retardancy as described above, but the flame retardancy does not reach the level of flame retardancy which the flame retarding fiber of the present invention requires.

Figure 2:
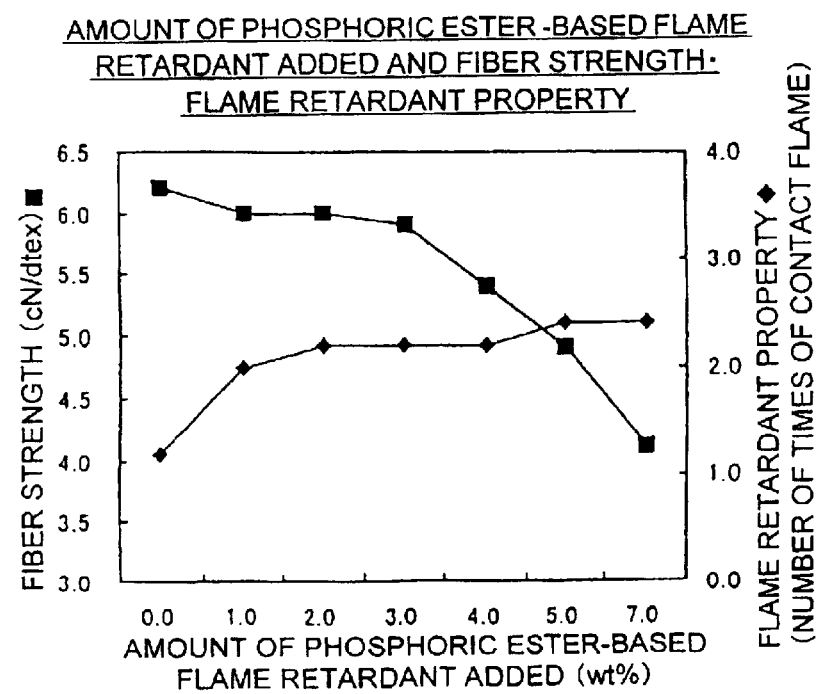
FIG. 2 is a graph showing a relation of flame retardancy and fiber strength with the content of a phosphoric ester-based flame retardant.

FIG. 2 is a graph showing a relation of flame retardancy and fiber strength with the content of a phosphoric ester-based flame retardant, for a polypropylene multi-filament yarn in which "FP-500" (1,3-phenylenebis(2,6-dimethylphenyl phosphate)) manufactured by Asahi Denka Industry Co., Ltd. which is an aromatic polyphosphate having the structure indicated in Chemical formula 1 is contained alone as the phosphoric ester-based flame retardant.

A master batch (MB) in which the phosphoric ester-based flame retardant is added to the polypropylene resin in high concentration is prepared, the MB is blended with the pellet of the polypropylene resin just before melt spinning in such a manner that the content of the phosphoric ester-based flame retardant becomes 0 to 7% by weight, melt spun, and thermally stretched, and the flame retardancy and fiber strength were measured.

Even if 7% by weight of the phosphoric ester-based flame retardant is contained, the flame retardancy does not reach the number of times of the contact flame of 4 or more aimed. On the other hand, the fiber strength is apt to be lowered in accordance with the increase of the added amount of a flame retardant, and it is grasped that when the content exceeds 3% by weight, the lowering of the fiber strength becomes large.

The present invention is illustrated in detail below with reference to specific Examples. Further, the flame retardancy of a fiber was evaluated as follows.

<Fiber Burning Test Method>
Evaluation Tester
A burning tester manufactured by Suga Test Co., Ltd. Type "FL-45M"
Preparation Method of Sample
A fabric was prepared from the flame retarding polyolefin fiber of the present invention using a barrel knitting machine.
Pieces of the fabric each adjusted to have its weight of 1 g are prepared by the barrel knitting machine.
Burning Property Test Method of Fiber Product
JIS No. L-1091 D method (contact flame test): 45° coil method is adopted.
1 g of a sample is adjusted to be 100 mm and inserted into a coil having a diameter of 10 mm.
The coil in which the sample is inserted is slanted to 45°.
The lowest end of the sample is fired by a micro burner.
The flame is brought to contact the sample and the time until it catches the fire is measured (this time is called as "firing time")
The contact flame is repeated until the position of 90 mm of the sample is burnt.
The number of times until the position of 90 mm of the sample is burnt is referred to as the number of times of the contact flame.
When all of the number of times of the contact flame is 3 or more during measurements of 5 times, it is deemed that the sample has the flame retardancy.
<Film Burning Test Method>
Evaluation Tester
A burning tester manufactured by Suga Test Co., Ltd. Type "FL-45M"
Preparation Method of Sample
A sample of 70 mm×300 mm is prepared from a biaxially stretched polyorefin film
Burning Property Test Method of Film Product (JIS No. L-1091)
An A-4 method, a vertical method
A test piece is vertically hung above a micro burner so that its lower end is at a height of 19 mm from the micro burner.
The height of the flame of the micro burner is set at 38 mm.
The lowest part of the sample is fired by the micro burner at a contact flame time of 12 seconds.
Firing situation, extinguishing situation, a time required for extinguishing fire and a burnt amount are measured.
Those which are not fired or extinguished within 3 seconds after firing were referred to as "having the flame retardancy".

EXAMPLE 1

A mixture obtained by mixing 1.5% by weight of "CGL-116L" manufactured by Chiba Specialty Chemicals Co., Ltd. as a NOR type HALS-based stabilizer and 1.0% by weight of "FP-500" manufactured by Asahi Denka Industries Co. Ltd., which is an aromatic polyphosphate having the structure indicated in the Chemical formula 1 as a phosphoric ester-based flame retardant, with a polypropylene resin having a melt flow rate value of 30 g/10 min. in which 0.1% of a benzophenone-base ultra-violet ray absorber was preliminarily added, was used as a raw material.

The mixture was melted using a melt spinning machine which was controlled at an extruder temperature of 230° C. and a spinning head temperature of 225° C., formed by a spinning mouth piece having 24 circular holes with a hole diameter of 0.8 mm, and wound up at a winding rate of 300 m/min. Further, this unstretched fiber was stretched at a stretching magnification of 5.86-fold and a stretching temperature of 80° C., and set thermally at a temperature of 135° C. to obtain a polypropylene multi-filament yarn. The reeling stability at this time was good.

The fiber strength and the flame retardancy of the fiber obtained are shown in Table 1. The fiber strength is 5.99 cN/dtex, and has an adequate strength capable of being used as building uses such as a curing net and the like. Further, the mean value of 5 samples is 5.2 times, therefore the flame retardancy is also extremely high. The firing time is a high value of 17 seconds which means excellent flame retardancy. Further, the fiber strength and the flame retardancy of the fiber after treating the polypropylene multi-filament yarn at 63° C. and for 800 hours in a fade meter tester, are shown in Table 1. After the treatment, the fiber strength is 4.35 cN/dtex and the flame retardancy is 4.6 times, which means that both are slightly lowered but the degree of the lowering is little. Namely, the change of the flame retardancy in a lapse of time is little and durability is excellent.

EXAMPLES 2 TO 6

A polypropylene multi-filament yarn was obtained under the same conditions as in Example 1, except that the contents of the HALS-based stabilizer and the phosphoric ester-based flame retardant, and the stretching magnification were changed to the values shown in Table 1. The fiber strength and the flame retardancy of the fiber obtained are shown in Table 1.

Any of Examples 2 to 6 has a fiber strength of 4.0 cN/dtex or more, and has the excellent flame retardancy that the flame retardancy has a mean value of 4 times or more and the number of times of the contact flame of each of the 5 samples is 4 times or more. However, when the content of the phosphoric ester-based flame retardant becomes much, the fiber strength is lowered.

EXAMPLE 7

A polypropylene multi-filament yarn was obtained under the same conditions as in Example 1, except that an ultra-violet ray absorber was not contained. The fiber strength and the flame retardancy of the fiber obtained are shown in Table 1. The fiber strength is 5.99 cN/dtex, and the flame retardancy has also a mean value of 5 samples of 5.4 times and is extremely high. The same result as in Example 1 was obtained. However, after the polypropylene multi-filament yarn obtained was treated in a fade meter tester under the same conditions as in Example 1, the fiber strength is 4.00 cN/dtex and the flame retardancy is also a mean value of 4.2 times. The result is slightly more inferior than Example 1, and durability is slightly inferior in comparison with Example 1, but it is a degree of having no problem for practical use.

EXAMPLE 8

A polypropylene multifilament yarn is obtained under the same conditions as in the Example 1 except that a mixture obtained by mixing 1.5% by weight of "CGL-116L" manufactured by Chiba Specialty Chemicals Co., Ltd. as a NOR type HALS-based stabilizer and 1.0% by weight of "FP-600" manufactured by Asahi Denka Industries Co. Ltd. which is an aromatic polyphosphate having the structure indicated in the Chemical formula 2 as a phosphoric ester-based flame retardant was used as a raw material.

The fiber strength and the flame retardancy of the fiber obtained are shown in Table 1. The fiber strength is 5.87 cN/dtex. And the mean value of 5 samples is 4.4 times and the firing time is a high value of 17 seconds which means excellent flame retardancy.

EXAMPLE 9

A polypropylene multifilament yarn is obtained under the same conditions as in the Example 1 except that a mixture obtained by mixing 1.5% by weight of "CGL-116L" manufactured by Chiba Specialty Chemicals Co., Ltd. as a NOR type HALS-based stabilizer and 1.0% by weight of an aliphatic phosphate manufactured by Yamato Chemical Industries Co. Ltd. which is an aromatic polyphosphate having the structure indicated in the Chemical formula 2 as a phosphoric ester-based flame retardant was used as a raw material.

The fiber strength and the flame retardancy of the fiber obtained are shown in Table 1. The fiber strength is 5.77 cN/dtex. And the mean value of 5 samples is 4.6 times and the firing time is a high value of 16 seconds which means excellent flame retardancy.

COMPARATIVE EXAMPLE 1

A polypropylene multi-filament yarn was obtained under the same conditions as in Example 1, except that only a polypropylene-base resin having a melt flow rate value of 30 g/10 min. was used, the NOR type HALS-based stabilizer and the phosphoric ester-based flame retardant were not contained, and the stretching magnification was changed to 4.46.

The fiber strength of the fiber obtained is 6.03 cN/dtex and high, but the flame retardancy is extremely low in a mean value of 1.2 times.

COMPARATIVE EXAMPLES 2 TO 5

A polypropylene multi-filament yarn was obtained under the same conditions as in Example 1, except that the contents of the NOR type HALS-based stabilizer and the phosphoric ester-based flame retardant, and the stretching magnification were changed. The fiber strength and the flame retardancy of the fiber obtained are shown in Table 1.

Any of them could not obtain a flame retarding fiber in which both of the fiber strength and the flame retardancy satisfy the target value. Although the content of the phosphoric ester-based flame retardant is 10% by weight and much in Comparative Example 3, the flame retardancy is a mean value of 3.6 times and low because the NOR type HALS-based stabilizer is not contained. This proves that the improvement of the flame retardancy is caused by the synergy effect of the NOR type HALS-based stabilizer with the phosphoric ester-based flame retardant.

TABLE 1

| | NOR type HALS-based stabilizer (wt %) | Phosphate-based flame retardant (wt %) | Ultra-violet ray absorber (wt %) | Stretching magnification | Evaluation 1 (before fade meter treatment) | | | Evaluation 2 (after fade meter treatment) | |
|---|---|---|---|---|---|---|---|---|---|
| | | | | | Fiber strength (cN/dtex) | Flame retardancy (number of times of contact flame) Mean value (n = 5) | Firing Time (second) | Fiber strength (cN/dtex) | Flame retardancy (number of times of contact flame) Mean value (n = 5) |
| Example 1 | 1.5 | 1.0 | 0.1 | 5.86 | 5.99 | 5.2 (6, 5, 5, 5, 5) | 17 | 4.35 | 4.6 (5, 4, 5, 4, 5) |
| Example 2 | 1.0 | 3.0 | 0.1 | 5.08 | 4.43 | 4.6 (5, 4, 4, 5, 5) | 18 | | |
| Example 3 | 1.2 | 3.0 | 0.1 | 5.08 | 4.20 | 4.8 (5, 4, 5, 5, 5) | 19 | | |
| Example 4 | 1.4 | 3.0 | 0.1 | 5.04 | 4.18 | 5.2 (5, 5, 5, 5, 6) | 19 | | |
| Example 5 | 1.5 | 2.0 | 0.1 | 5.48 | 5.44 | 6.0 (7, 5, 6, 6, 6) | 18 | | |
| Example 6 | 2.0 | 1.0 | 0.1 | 5.80 | 5.90 | 5.4 (5, 6, 5, 5, 6) | 18 | | |
| Example 7 | 1.5 | 1.0 | 0.0 | 5.86 | 5.99 | 5.4 (6, 5, 5, 6, 5) | 17 | 4.00 | 4.2 (5, 4, 4, 4, 4) |
| Example 8 | 1.5 | 1.0 | 0.1 | 5.86 | 5.87 | 4.4 (4, 5, 4, 4, 5) | 17 | | |
| Example 9 | 1.5 | 1.0 | 0.1 | 5.86 | 5.77 | 4.6 (4, 5, 5, 4, 5) | 16 | | |
| Comparative Example 1 | 0.0 | 0.0 | 0.1 | 6.46 | 6.03 | 1.2 (1, 1, 2, 1, 1) | 3 | | |
| Comparative Example 2 | 5.0 | 0.0 | 0.1 | 5.88 | 5.82 | 2.8 (2, 3, 3, 3, 3) | 8 | | |

TABLE 1-continued

|  | NOR type HALS-based stabilizer (wt %) | Phosphate-based flame retardant (wt %) | Ultra-violet ray absorber (wt %) | Stretching magnification | Evaluation 1 (before fade meter treatment) ||| Evaluation 2 (after fade meter treatment) ||
|---|---|---|---|---|---|---|---|---|---|
|  |  |  |  |  | Fiber strength (cN/dtex) | Flame retardancy (number of times of contact flame) Mean value (n = 5) | Firing Time (second) | Fiber strength (cN/dtex) | Flame retardancy (number of times of contact flame) Mean value (n = 5) |
| Comparative Example 3 | 0.0 | 10.0 | 0.1 | 4.20 | 3.10 | 3.6 (4, 3, 3, 4, 4) | 8 |  |  |
| Comparative Example 4 | 0.3 | 3.0 | 0.1 | 5.12 | 4.22 | 2.6 (2, 3, 3, 3, 2) | 6 |  |  |
| Comparative Example 5 | 1.5 | 0.3 | 0.1 | 6.12 | 5.98 | 2.8 (3, 3, 3, 2, 3) | 7 |  |  |

Fade meter treatment condition; 63° C. × 800 hrs

COMPARATIVE EXAMPLE 6

A polypropylene multi-filament yarn was obtained under the same conditions as in Example 1, except that "X-40-9805" manufactured by Shinetsu Silicone Co., Ltd. which is a silicone-based flame retardant was used as a flame retardant in combination with the NOR type HALS-based stabilizer. The flame retardancy of the fiber obtained became a worse value than that of a usual polypropylene fiber as the mean value of the number of times of contact flame of 5 samples was one. From this result, the improvement of the flame retardancy caused by the synergy effect of the NOR type HALS-based stabilizer with the phosphate-based flame retardant is also recognized.

EXAMPLE 10

A polypropylene resin having a melt flow rate value of 30 g/10 min. in which 0.1% by weight of a benzophenone-base ultra-violet ray absorber and 0.2% by weight of a CH₃-type HALS-based stabilizer was used as a sheath portion raw material, and a mixture obtained by mixing 1.0% by weight of "CGL-116L" manufactured by Chiba Specialty Chemicals Co., Ltd. as a NOR type HALS-based stabilizer and 1.0% by weight of "FP-500" manufactured by Asahi Denka Industries Co., Ltd. as a phosphate-based flame retardant, with a polypropylene resin having a melt flow rate value of 30 g/10 min. and in which 0.1% by weight of a benzophenone-base ultra-violet ray absorber were preliminary added was used as a core portion raw material.

The mixture was melted so that the ratio of the core to the sheath is 1 using a melt spinning machine which was controlled at an extruder temperature of 230° C. and a spinning head temperature of 225° C., formed by a conjugated spinning mouth piece having 30 circular holes with a hole diameter of 0.8 mm, taken up at a speed of 300 m/min., successively stretched at a stretching magnification of 6.07-fold and a stretching temperature of 80° C. without winding up, and set thermally at a temperature of 135° C. to obtain a polypropylene core-sheath type conjugated multi-filament yarn. The spinning stability at this time was good.

The fiber strength of the core-sheath type conjugated multi-filament yarn obtained is 5.52 cN/dtex, and has an adequate strength capable of being used as building uses such as a curing net and the like. Further, the flame retardancy was that the number of times of contact flame of 5 samples are 6, 5, 5, 5 and 5, and the mean value thereof was 5.2 times and very high. Further, the firing time showed also a high value of 16 seconds, and it was a fiber having an extremely high flame retardancy. Further, the odor at spinning and of a product was also at a level having no problem.

COMPARATIVE EXAMPLE 7

A core-sheath type polypropylene multi-filament yarn was obtained under the same conditions as in Example 8, except that the NOR type HALS-based stabilizer added to the core portion raw material was changed to 0.7% by weight.

The fiber strength of the fiber obtained was 5.42 cN/dtex, and has an adequate strength capable of being used as building uses such as a curing net and the like. Concerning the flame retardancy, the mean number of times of contact flame was 4.2, and it attained a target value. However, the number of times of contact flame of 5 samples are 5, 5, 4, 4 and 3, those in which the number of times of contact flame is 3 are included among 5 samples, and the flame retardancy is not adequate.

EXAMPLE 11

A mixture obtained by mixing 1.5% by weight of "CGL-116L" manufactured by Chiba Specialty Chemicals Co., Ltd. as a NOR type HALS-based stabilizer and 1.0% by weight of "FP-500" manufactured by Asahi Denka Industries Co., Ltd., as a phosphoric ester-based flame retardant, with a polypropylene resin having a melt flow rate value of 30 g/10 min. was used. The mixture was melted using a melt spinning machine which was controlled at an extruder temperature of 235° C. and a spinning head temperature of 230° C., formed by a T-die of 1 mm×300 mm, and wound up at a winding rate of 30 m/min. Further, this unstretched film was stretched at a longitudinal stretching magnification of 3-fold, a lateral stretching magnification of 2-fold and a stretching temperature of 80° C., to obtain a polypropylene film having a thickness of 100 μm.

The flame retardancy of the obtained film is shown in Table 2. This film got molten and fall when the fire approaches so that it did not catch fire, which means the flame retardancy of this film is very excellent.

EXAMPLES 12 TO 14

A polypropylene film was obtained under the same conditions as in Example 11, except that the contents of the NOR type HALS-based stabilizer and the phosphate-based flame retardant and the thickness of a film were changed to the values shown in Table 2.

The thickness and the flame retardancy of the film obtained are shown in Table 2. Any of the films of Examples 12 and 13 was not fired because it falls down by melting when fire approaches, and is a film extremely excellent in the flame retardancy. Although the film of Example 14 is melted and fired by the approach of fire, fire is extinguished after 3 seconds, and it reveals an excellent flame retardancy. Further, the contents of the NOR type HALS-based stabilizer and the phosphate-based flame retardant were the same as in Examples 11, 13 and 14, and only the thickness of the films was made different. When these three Examples are compared, it is recognized that it is apt to be fired when the thickness of the film becomes large.

COMPARATIVE EXAMPLES 8 TO 10

A polypropylene film was obtained under the same conditions as in Example 11, except that the contents of the NOR type HALS-based stabilizer and the phosphate-based flame retardant and the thickness of a film were changed to the values shown in Table 2. The thickness and the flame retardancy of the film obtained are shown in Table 2.

Although the contents of the NOR type HALS-based stabilizer and the phosphate-based flame retardant in Comparative Example 10 in which the thickness exceeds 300 μm were the same as in Example 11, the film was fired by approach of flame and the fire spreads, therefore no flame retardancy was obtained. Further, in Comparative Example 9 in which only the phosphate-based flame retardant was added, the film is also fired by approach of flame and the fire is spread, therefore no flame retardancy is obtained. On the other hand, the film is fired by approach of flame in Comparative Example 8 in which only the NOR type HALS-based stabilizer was added, fire is extinguished after 7 seconds, the flame retardancy is revealed, but the flame retardancy did not reach a level which the present invention realizes.

TABLE 2

Result of study of polypropylene film

| | NOR type HALS-based stabilizer (wt %) | Phosphate-based flame retardant (wt %) | Film thickness (μm) | Flame retardancy |
|---|---|---|---|---|
| Example 11 | 1.0 | 1.0 | 100 | ⊚ film melted and did not catch fire. |
| Example 12 | 1.5 | 1.0 | 100 | ⊚ film melted and did not catch fire. |
| Example 13 | 1.0 | 1.0 | 50 | ⊚ film melted and did not catch fire. |
| Example 14 | 1.0 | 1.0 | 200 | ○ film melted and caught fire but was distinguished in 3 seconds |
| Comparative Example 8 | 1.0 | 0.0 | 100 | Δ film melted and caught fire but was distinguished in 7 seconds |
| Comparative Example 9 | 0.0 | 3.0 | 100 | X film caught fire and the fire spread |
| Comparative Example 10 | 1.0 | 1.0 | 600 | X film caught fire and the fire spread |

As described above, according to the present invention, a flame retarding polypropylene fiber and flame retarding polypropylene film containing no halogen-based retardant, being environmentally suitable material, having both an adequate fiber strength as fiber uses or as film uses and a good flame retardancy, and further having a little lowering of strength in a lapse of time, is provided.

What is claimed is:

1. A production method of a flame retarding polypropylene fiber, wherein 0.4% by weight or more of a hindered amine-based stabilizer and 0.5% by weight or more of a phosphoric ester-based flame retardant are mixed with a polypropylene resin having a melt flow rate value of 5 to 50 g/10 min. the mixture is melt-spun to form an undrawn yarn, and then the yarn is drafted at a drafting magnification of 2 to 7-fold and a drafting temperature of 50 to 100° C. and further set thermally at a temperature of 60 to 140° C.

2. A production method according to claim 1, wherein the fiber produced has a fiber strength of 4.0 cN/dtex or more.

3. A production method according to claim 1, wherein the phosphoric ester-based flamed retardant is an aromatic phosphate.

4. A production method according to claim 1, wherein said hindered amine-based stabilizer is represented by NOR, wherein R of an alkoxyl group, (—OR), of the NOR type hindered amine-based stabilizer is a cycloalkyl group having 5 to 12 carbons.

5. A production method according to claim 1, wherein the fiber is multifilament polypropylene yarn.

6. A production method according to claim 1, wherein the flame retarding polypropylene fiber has a core-sheath structure, the core component is a polypropylene resin containing the phosphoric ester-based flame retardant and an NOR type hindered amine-based stabilizer, the sheath component is a polypropylene resin containing 0.3% by weight or less of the hindered amine-based stabilizer, and the total fiber contains 0.5% by weight or more of the phosphoric ester-based flame retardant and 0.4% by weight or more of the NOR type hindered amine-based stabilizer.

* * * * *